Sept. 19, 1961  H. W. STRAUB  3,001,079
OPTICAL DEVICES FOR PRODUCING PARALLEL BEAMS
Filed June 19, 1959

INVENTOR
HARALD W. STRAUB
BY S.J. Rotondi, A.S. Dupont,
F.E. McGee & J.D. Edgerton

3,001,079
**OPTICAL DEVICES FOR PRODUCING
PARALLEL BEAMS**
Harald W. Straub, Bethesda, Md., assignor to the United
States of America as represented by the Secretary of
the Army
Filed June 19, 1959, Ser. No. 821,615
2 Claims. (Cl. 250—216)
(Granted under Title 35, U.S. Code (1952), sec. 266)

The invention described herein may be manufactured and used by or for the Government for governmental purposes without the payment to me of any royalty thereon.

This invention relates generally to optical devices, and more particularly to light detection and projection devices capable of producing parallel beams of predetermined constant cross section out to some rather large predetermined distance. For the purposes of this specification and the appended claims the term "beam" will be used to refer to the volume in space over which a light detection device is sensitive, as well as to the more common use of the term "beam" as the volume in space which is lighted by a light projection device, such as a flashlight.

For some time it has been a considerable problem in the art to obtain a light detection or projection device which produces a parallel beam of constant cross section out to any large distance. Prior art attempts to achieve such a beam have involved the use of a parabolic mirror with a detector or a light source placed at the focal point of the parabolic mirror. If the source or the detector were a true point source, a parallel beam would be obtained out to a very large distance. However, as will be appreciated, it is practically impossible to obtain a point source or a point detector. Where small size detectors or light sources are used in an attempt to approximate points so as to obtain truly parallel light, the intensity or sensitivity obtained from such approximate point sources and detectors is so small as to be unusuable in many important applications. And, if the source or detector size is to be increased to increase the intensity or sensitivity, it is found that the beam is no longer parallel. The result is thus that, using prior art techniques, a parallel beam with sufficient sensitivity or intensity cannot be obtained.

In the search for some means or technique for producing a parallel beam I discovered that a parallel beam can be produced having a desired predetermined cross section out to a large distance, in an amazingly simple manner apparently not previously recognized in the art. By employing my discovery as herein disclosed, I have been able to achieve light detection and projection devices having high intensity or high sensitivity parallel beams which have a constant cross section of one inch out to the comparatively large distance of fourteen feet, and even this large distance is not the maximum which can be obtained. Furthemore, this amazing performance is achieved by devices which at first glance do not appear to be very much different from simple light projection or detection devices. However, by proper design in accordance with this invention, these simple devices are able to provide parallel beams of predetermined cross sections out to large distances which could only be approached by much more complex prior art devices.

The present invention is based upon the discovery that if: (1) an object is assumed to be placed at the distance from a lens or mirror out to which it is desired that the beam be parallel, (2) the cross section of the object is made equal to the cross section of the mirror, and (3) a detector or a light source having the same cross section as the resulting image is placed at the image of the object, then a beam will be obtained which is entirely confined within the volume in space formed by parallel lines running from the edges of the mirror or lens to the corresponding edges of the object. The cross section of the mirror is intended to refer to the cross section formed by its edges. Making use of this discovery light detection and projection devices have been designed in accordance with the invention which are capable of providing parallel beams of predetermined constant cross sections out to practically any desired predetermined distance, limited only by the quality of the lens or mirror.

It is, therefore, the chief object of this invention to provide light detection and projection devices which can be designed to have parallel beams of predetermined constant cross sections out to a desired predetermined distance.

It is a further object to provide light projection and detection devices in accordance with the above mentioned object which are rugged, simple and compact.

Figure 1:
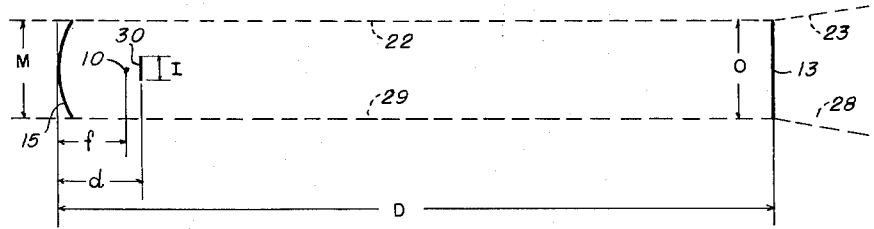
FIGS. 1 and 2 are two-dimensional diagrammatic views used in explaining the operation of the invention.

FIG. 1 shows a side view of concave mirror 15 having a diameter M and a focal point indicated at 10 at a distance $f$ from the center of the mirror 15. If it is now desired that a parallel beam be obtained as indicated by the parallel lines 22 and 29 extending from the edges of the mirror 15 to the edges of the object 13, the following design procedure is followed in accordance with the invention. It is assumed that at the distance D out to which it is desired that the beam be parallel there is placed an object 13 having a diameter O equal to the diameter M of the mirror. For an object 13 at the distance D and having a diameter O, the mirror 15 forms an inverted image 30 at a distance $d$ having a diameter I as shown in FIG. 1. The values of I and $d$ may be determined from the following well known optical equations:

$$\frac{1}{f} = \frac{1}{d} + \frac{1}{D} \qquad (1)$$

$$\frac{O}{I} = \frac{D}{d} \qquad (2)$$

Thus, from the above two equations, it will be understood that if a light detector is placed at the distance $d$ having a diameter equal to I, the resulting beam will be parallel and entirely confined within the parallel lines 22 and 29 out to the distance D. Beyond the distance D the beam begins to diverge as indicated by the dashed lines 23 and 28.

It should be noted that although the beam is parallel and of constant cross section out to the distance D, the rays between the mirror and the object are not necessarily parallel, and the intensity or sensitivity is not uniform across the beam. However, this does not matter in many important applications for which light detection and projection devices are used, wherein the real requirement is that the beam be parallel and of constant cross section. Any requirement that the individual rays be parallel or that the beam have uniform sensitivity or intensity across the beam is only of minor importance.

It should further be noted that the above-outlined design procedure in accordance with the invention does not require that the light source or detector be a point source or point detector as is required using the parabolic mirror technique for producing parallel rays. Instead, the requirement is that the detector or light source have the same size as the image, which has the important effect of permitting the light source or detector to achieve a much greater sensivity or intensity than might otherwise be the case where small size is necessary to approximate a point source as in prior art devices. As a result, the present invention not only achieves the desired parallel beam out to amazingly large distances, but in addition, makes possible sensitivities and intensities at these large distances which have never before been achieved in the art, and the physical structure required is remarkably simple. The distance out to which a parallel beam can be obtained in accordance with the invention is limited only by the quality of the lens or mirror and by the effect of diffraction; an ideal lens or mirror would theoretically permit a parallel beam to be obtained out to an infinite distance.

Figure 2:
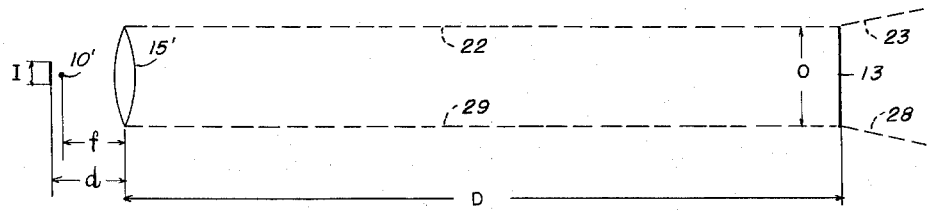

FIG. 2 illustrates how the invention may be applied to a lens system where a concave lens 15' having a focal point at 10' is substituted for the concave mirror 15 of FIG. 1. As is well known in the art, a lens system operates identically to a mirror system and is governed by the same optical Equations 1 and 2 previously presented. Thus, the same design procedure applied to the FIG. 1 mirror system is also applicable to the FIG. 2 lens system.

It will be understood by those skilled in the art that although FIGS. 1 and 2 only show two dimensional views, the cross section of the mirror or lens can be made in a wide variety of shapes. For example, the mirror or lens cross section could be circular, rectangular, or even triangular if so desired. Of course, the assumed object 13 at D must then be assumed to have the same cross section as the mirror or lens, thus forming an inverted image of the same shaped cross section in accordance with Equation 2, and thereby requiring the detector or light source to have the same cross section as the image. The resultant beam obtained, therefore, will include a volume in space out to the distance D having a constant cross section and formed by parallel lines extending between corresponding points in the assumed object and the lens or mirror.

Figure 3:
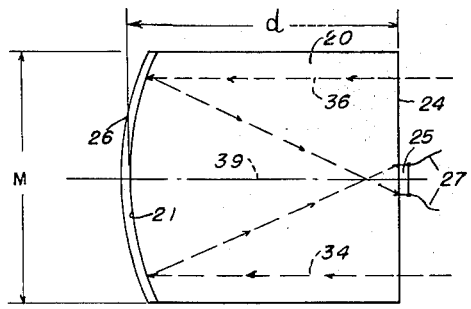
FIG. 3 is a side view of a light detection device in accordance with the invention.
Figure 4:
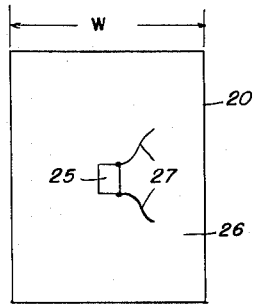
FIG. 4 is a front view of FIG. 3.

FIGS. 3–4 and 5–6 show two embodiments of light detectors designed in accordance with the invention. In FIGS. 3 and 4 which show front and side views of one embodiment of a light detector, a mirror 26 is formed on a curved end 21 of a rectangular cylinder of optical glass 20 by metal evaporation techniques. The end 21 is curved so that the mirror 26 is formed having the desired curvature and cross section.

In FIGS. 3–4 the embodiment shown has been chosen to have a cross section of M×W, which in accordance with this invention will produce a beam of the same cross section. The rectangular cylinder of optical glass 20 is chosen to have a length $d$ measured from the center of the end 21 which is equal to the distance $d$ from the mirror at which an image would be formed if an object having the same cross section as the mirror 26 were assumed to be placed at the distance D out to which it is desired that the beam be parallel with a constant cross section W×M. This image distance $d$ is readily determined from Equation 1 knowing the focal length of the mirror 26 and the distance D. The cross sectional dimensions of the optical glass 20 are preferably chosen to be the same as that of the mirror 26 so as to completely fill the volume of the beam throughout the length $d$, thereby eliminating any refraction effects that might otherwise occur. A light detector element 25 having the same shaped cross section as the mirror 26 and having a cross sectional area equal to that of the image of the assumed object is cemented on the flat end 24 of the rectangular cylinder of optical glass 20 along the longitudinal axis 29 of the mirror 26. Any suitable light detector may be used such as a surface of lead sulfide on glass with suitable leads 27 connected to appropriate points thereof in accordance with well known practice. The dashed lines 34 and 36 in FIG. 2 illustrate the paths of two light rays which pass through the rectangular cylinder of optical glass 20, strike the mirror 30 and are reflected to the detector 25. The effect of changes in the light reaching the detector 25 may be observed by connecting the leads 27 to suitable electronic circuitry (not shown).

Figure 5:
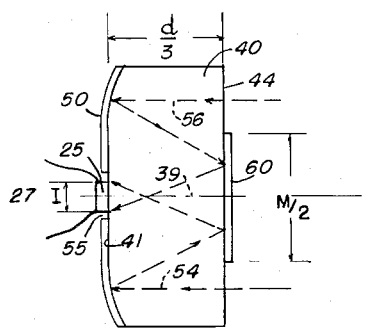
FIG. 5 is a side view of another embodiment of a light detection device in accordance with the invention.
Figure 6:
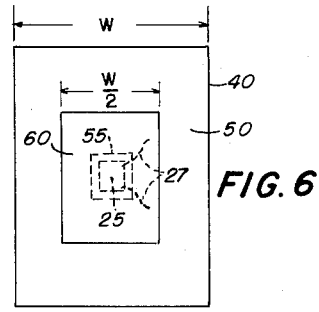
FIG. 6 is a front view of FIG. 5.

FIGS. 5–6 illustrate side and front views of another embodiment of the invention in which light fold-over principles are utilized to achieve compactness and greater ruggedness. In this embodiment a rectangular cylinder of optical glass 40 is employed having a length equal to ⅓ of that of the optical glass rectangular cylinder 20 in FIGS. 3–4, that is, equal to $d/3$ which is half the distance from the mirror 50 to the image. As was done in the embodiment of FIGS. 3–4, a mirror 50 is formed on a curved end 41 of the rectangular cylinder of optical glass 40, by metal evaporation techniques, the end 41 being curved so that the mirror 50 is formed having the desired curvature and cross section. In this embodiment, however, a small area 55 at the center of the mirror 50 is left uncoated and the detector 25 with suitable leads 27 is cemented thereon. The end 44 of the optical glass 40, is spaced a distance $d/3$ from the mirror 50, has a second flat mirror 60 coaxially formed thereon, also by metal evaporation techniques. The mirror 60 is chosen to have the same shaped cross section as that of the mirror 50, but the area thereof, that is, the mirror 60 will have a width of $w/2$ and a length of $M/2$ as shown in FIGS. 4–5. Dashed lines 54 and 56 in FIG. 4 illustrate the paths of two light rays which enter the optical glass 40, strike the mirror 50, are reflected to the mirror 60 and then reflected back to the detector 25. It can be seen that the mirror 60 on the side 44 merely folds over the light pattern, thereby permitting the resultant size of the device to be ⅓ that of a device such as FIGS. 3–4 where foldover is not used. The use of foldover techniques in general are well known in the art and have the important advantage in the present invention of making it possible to achieve much greater compactness which additionally leads to a more rugged device.

It is to be understood in connection with this invention as illustrated by the embodiments of the drawing that the curvature of the mirror or lens used may be chosen to have any desired shape which is capable of producing an image. Thus, a parabolic shaped mirror will not be satisfactory, because it will not produce a suitable image as a result of its parallel light forming characteristics. However, a spherical mirror has been found to be entirely satisfactory, and perhaps the best type of mirror curvature is that of an ellipsoid since such a mirror has two foci, a near focus and a far focus. If an ellipsoidal mirror is chosen and the distance out to which the beam is to be confined within parallel limits is located at the far focus, an image of high quality will be produced at the near focus, thereby permitting a parallel beam to be produced out to vary large distances.

Many applications will occur to those skilled in the art where it is of considerable importance that a light detection or light projection device having the characteristics provided by this invention are required. For example, this invention may be used in the field of ballistic measurements where it is desired to accurately obtain an indication of a predetermined point on a missile trajectory. Also, light detection and projection devices in accordance with my invention will find important use in the field of accurate automatic machining or in automatic testing of machine parts where it is desirable to very accurately control the motion or the quality of machining operations.

It is to be understood that although the present invention has been illustrated embodied in the form of a light detection device, it is just as applicable to a light projection device. For example, the detector 25 in FIGS. 3 through 6 may be replaced by a light source having the same image cross section. These devices would then be light projection devices capable of projecting a parallel beam having a cross section equal to the cross section of the mirror out to the distance D for which the mirror or lens and system have been designed. It is also to be understood that although the embodiments illustrate the use of mirrors, equivalent systems may also be employed as was brought out in connection with FIG. 2.

It is further to be understood that any additional lens or mirror systems may be interposed between the lens or mirror and the source of detector to provide a desired light transformation operation, it being only necessary to adjust the resulting system to take into account the effects of the light transformation operation, as was done in the embodiment of FIGS. 5–6 where light foldover was used.

It will thus be apparent that the illustrative embodiments described are only exemplary and that various modifications can be made in construction and arrangement within the scope of the invention as defined in the appended claims.

I claim as my invention:

1. A compact and rugged light detection device having a parallel beam sensitivity of predetermined constant cross section out to a relatively large predetermined distance, said device comprising in combination: a rectangular cylinder of optical glass having one end curved and the other end flat, a concave mirror formed on the curved end of said cylinder with a small area at the center of the curved end being left uncovered, said mirror having substantially said predetermined cross section, a light detector cemented to the uncovered small area with its light sensitive surface in contact with the optical glass, and a flat mirror formed on the flat end of said cylinder having a cross section whose dimensions are equal to substantially one-half of the dimensions of the cross section of said mirror, said rectangular cylinder of optical glass being chosen to have a length equal to one-third the distance from said mirror at which an image would be formed of an object placed at said predetermined distance and having substantially said predetermined cross section, said light detector having a cross section substantially equal to the cross section of said image.

2. The method of producing a parallel light beam out to a distance D, comprising the steps of: providing an image producing device having a diameter M equal to the desired width of said beam, placing at the distance D from said device an object having a diameter equal to M, providing a light source having a diameter equal to that of the image of said object, and placing said light source at the position where said image is formed.

References Cited in the file of this patent

UNITED STATES PATENTS

| | | |
|---|---|---|
| 1,385,657 | Bell et al. | July 26, 1921 |
| 1,718,999 | Case | July 2, 1929 |
| 2,057,395 | Sharp | Oct. 13, 1936 |
| 2,668,867 | Ekstein | Feb. 9, 1954 |
| 2,674,700 | Small | Apr. 6, 1954 |
| 2,721,275 | Jackson | Oct. 18, 1955 |

FOREIGN PATENTS

| | | |
|---|---|---|
| 1,045,818 | France | July 1, 1953 |
| 1,149,437 | France | July 8, 1957 |